United States Patent
Bolton et al.

(10) Patent No.: US 8,813,096 B2
(45) Date of Patent: Aug. 19, 2014

(54) PREDICTING THE IMPACT OF CHANGE ON EVENTS DETECTED IN APPLICATION LOGIC

(75) Inventors: Stephen P. Bolton, Fleet (GB); Ann E. Collins, Salisbury (GB); Gillian Curwen, Winchester (GB); Catherine M. Moxey, Newbury (GB); Anthony P. Papageorgiou, Southampton (GB); Andrew D. Wharmby, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 149 days.

(21) Appl. No.: 13/271,110

(22) Filed: Oct. 11, 2011

(65) Prior Publication Data

US 2013/0091511 A1 Apr. 11, 2013

(51) Int. Cl.
*G06F 9/46* (2006.01)
(52) U.S. Cl.
USPC ................................ 719/318; 714/1
(58) Field of Classification Search
None
See application file for complete search history.

(56) References Cited

U.S. PATENT DOCUMENTS

| | | | |
|---|---|---|---|
| 7,467,145 B1 * | 12/2008 | Castellanos et al. | 1/1 |
| 7,552,443 B2 * | 6/2009 | Upton | 719/315 |
| 7,774,790 B1 * | 8/2010 | Jirman et al. | 719/318 |
| 2003/0033163 A1 * | 2/2003 | Habiby et al. | 705/1 |
| 2006/0085798 A1 * | 4/2006 | Bendiksen et al. | 719/318 |
| 2006/0277594 A1 * | 12/2006 | Chiavegatto et al. | 726/2 |
| 2009/0094609 A1 * | 4/2009 | Burukhin et al. | 718/104 |
| 2009/0171703 A1 * | 7/2009 | Bobak et al. | 705/7 |
| 2009/0172668 A1 * | 7/2009 | Bobak et al. | 718/100 |
| 2009/0172669 A1 * | 7/2009 | Bobak et al. | 718/100 |
| 2009/0228898 A1 * | 9/2009 | Aveyard et al. | 719/314 |
| 2011/0054974 A1 * | 3/2011 | Bobst et al. | 705/8 |
| 2011/0153465 A1 * | 6/2011 | Pombo et al. | 705/27.1 |
| 2011/0258321 A1 * | 10/2011 | Jeffrey | 709/226 |
| 2012/0167117 A1 * | 6/2012 | Kekeh et al. | 719/318 |
| 2012/0174063 A1 * | 7/2012 | O'Carroll et al. | 717/116 |
| 2013/0041924 A1 * | 2/2013 | Vernier | 707/798 |
| 2013/0091512 A1 | 4/2013 | Bolton et al. | |

OTHER PUBLICATIONS

"Non-invasive detection of events in application logic", IPCOM000180310D, published by IP.com, Mar. 6, 2009, 2 pages.
G. Van de Putte, et al. "Implementing and Administering WebSphere Business Integration Server V4.2.2", published by IBM Corporation, Jul. 2004, 452 pages.
Stephen P. Bolton, et al., U.S. Appl. No. 13/411,554, filed Mar. 3, 2012, Office Action, May 9, 2013, 17 pages.
Stephen P. Bolton, et al., U.S. Appl. No. 13/411,554, filed Mar. 3, 2012, Office Action, Oct. 4, 2013, 34 pages.

* cited by examiner

*Primary Examiner* — Emerson Puente
*Assistant Examiner* — Mehran Kamran
(74) *Attorney, Agent, or Firm* — Marcia L. Doubet (57) ABSTRACT

A search facility is used to predict the impact of change on events detected in application logic, where the change may involve a computing resource used by or referenced by the application logic and/or by event detection logic. The search may be performed prior to making a change, in order to judge potential impact of the change, or after the change has been made. The search makes the prediction by evaluating semantics of conditions that specify when and/or and how an event will be detected at run-time.

15 Claims, 10 Drawing Sheets

300

| Context Predicate Names | description |
|---|---|
| Transaction | current transaction ID |
| Program | current program name |
| User ID | user ID associated with current transaction |
| Response Code | such as OK, not OK |
| EIBAID | identification of key pressed by user |
| EIBCPOSN | current position of cursor |
| | |
| Event Option Predicate Names | |
| File | file name used on current command |
| Map | name of map on current SEND MAP command |
| | |
| Application Data Predicate Names | |
| From | field used on a number of commands to specify a data source |
| To | field used on a number of commands to specify a data target |

FIG. 1
100

110
Specification Name:    Capture_reads_of_Payroll_file

| | 120 parameter name | 130 comparator | 140 parameter value |
|---|---|---|---|
| 150 | Application Name | begins_with | ABC |
| 151 | Command Type | equals | READ |
| 152 | Target File | begins_with | PAYROLL |

FIG. 2
200

Specification Name:    Report_Large_Refund_on_Shipping

| | parameter name | comparator | parameter value |
|---|---|---|---|
| 250 | Application Name | ALL | (null) |
| 251 | Service Name | equals | SHIPPING |
| 252 | Operation Name | equals | CALC_REFUND |
| 253 | Transaction ID | ALL | (null) |
| 254 | Starting Position | equals | 8 |
| 255 | Length | equals | 6 |
| 256 | Value | greater_than | 100 |

| Context Predicate Names | description |
|---|---|
| Transaction | current transaction ID |
| Program | current program name |
| User ID | user ID associated with current transaction |
| Response Code | such as OK, not OK |
| EIBAID | identification of key pressed by user |
| EIBCPOSN | current position of cursor |

| Event Option Predicate Names | |
|---|---|
| File | file name used on current command |
| Map | name of map on current SEND MAP command |

| Application Data Predicate Names | |
|---|---|
| From | field used on a number of commands to specify a data source |
| To | field used on a number of commands to specify a data target |

FIG. 4

400 Specification Name: Sample_1

| parameter name | comparator *411* | parameter value |
|---|---|---|
| 410 Source File | not_starts_with | C *412* |

420 Specification Name: Sample_2

| parameter name | comparator | parameter value |
|---|---|---|
| 430 Source File | equals *431* | COMP *432* |

440 Specification Name: Sample_3

| parameter name | comparator | parameter value |
|---|---|---|
| 450 Source File | starts_with | C |
| 460 Transaction ID | equals | PAYR |

| Search string | Search for resource type | Where found |
|---|---|---|
| 610 — EQUI | TRANSACTION | Context |
| 620 — EXMPCAT | FILE | Event options |
| 630 — DFH$W2F1 | URIMAP | Adapters |

PREDICTING THE IMPACT OF CHANGE ON EVENTS DETECTED IN APPLICATION LOGIC

BACKGROUND

The present invention relates to computing systems, and deals more particularly with using a computing system to predict how change to a computing resource, such as an application or its data, may impact event detection as application logic executes at run time.

As an application program executes, significant events may occur which could be of interest not only to the logic of the application but outside the application as well. When such events are detected at run time, they may be captured and emitted for use outside the application. The emitting may comprise, for example, recording information about the detected event in an event log and/or generating a notification message for a systems administrator.

BRIEF SUMMARY

The present invention is directed to predicting impact of change on event detection. In one aspect, this comprises: obtaining search input describing a changed computing resource; and programmatically evaluating each of at least one event detection specification to predict whether the changed computing resource will impact event detection, by the event detection specification, at run time. The changed computing resource may comprise, by way of example, an application program, a data object used by an application program, or an interface used by an application program. The search input describing the changed computing resource may comprise, by way of example, a name of a changed computing resource (such as a file name of a changed file), or a name of the changed computing resource and a specification of at least one resource type to be searched for event detection specifications to be used by the programmatic evaluation. The programmatic evaluation may comprise comparing the search input to each of at least one condition specified in an event detection specification until determining whether a prediction can be made that the changed computing resource will match the condition at run time. A report may be generated that documents each evaluated detection specification for which the programmatic evaluation predicts that the changed computing resource will impact event detection, by the event detection specification, at run time.

Embodiments of these and other aspects of the present invention may be provided as methods, systems, and/or computer program products. It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

BRIEF DESCRIPTION OF THE SEVERAL VIEWS OF THE DRAWINGS

The present invention will be described with reference to the following drawings, in which like reference numbers denote the same element throughout.

DETAILED DESCRIPTION

An embodiment of the present invention provides a mechanism for analysis of loosely-coupled event emission to predict whether the firing of events will be impacted by changes to computing resources. The resource changes may comprise, by way of illustration, changes to resources that are referenced in commands issued by an application, changes to the layout of an interface relied upon by a command, and so forth. A search facility is provided that takes, as input, information pertaining to a change that has been, or might be, made. Output of the search facility is information pertaining to events which will, or which might be, impacted by this change. In a preferred embodiment, the impact to event emission is predicted by evaluating event capture specifications that specify conditions for event emission, in view of whether and how those event capture specifications would be fired at run time.

Use of event capture specifications will now be described, followed by a discussion of how those event capture specifications may be searched using an embodiment of the present invention.

As noted earlier, events that occur as an application executes may be of interest outside the application itself. It is therefore desirable to detect such events, and capture and emit the fact that the event occurred. Various information about the event may also be captured and emitted. Preferably, the event processing—that is, the event detection, capture, and emitting—is done in a way that is non-invasive to the logic of the executing application. In other words, event processing is preferably done such that the application itself does not need to be changed in order for event processing to occur. This allows event processing to be provided, by way of illustration but not of limitation, for legacy applications and for other applications for which it is not feasible to modify the source code.

One known way in which non-invasive event processing can be provided for applications is to define event-detection conditions in a specification, which is created as a file or object, and to evaluate the specification by an event processor in the run-time environment. The term "event capture specification" is used herein to refer to such a specification. A number of event capture specifications may be provided for a particular application, where each event capture specification preferably describes the conditions for detecting a single event. If a particular event may be detected under more than one set of conditions, then a separate event capture specification may be defined for each such set of conditions. Alternatively, event capture specifications might be designed to describe the conditions for detecting more than one event. The term "predicate" is also used herein to refer to a condition in an event capture specification. (Event capture specifications are referred to as containing "conditions" or "predicates" in the plural, for ease of reference, although an event capture specification that contains a single condition/predicate is also within the scope of the present invention.)

Processing of an event capture specification may be triggered, for example, when an executing application issues a command that invokes a command processor of the run-time environment, where the command processor is adapted for also processing event capture specifications. As one alternative, the command processor may invoke a separate capture specification processor. For ease of reference, the processing is referred to herein as being done by the "run-time environment". As the run-time environment processes event capture specifications, externally-visible artifacts of the application may be evaluated, and events may be captured and emitted if the artifacts match the conditions in the event capture specifications. In this context, an externally-visible artifact may comprise, inter alia, a command which is issued from the application for execution by the run-time environment. In this example, an event capture specification might specify conditions having semantics such as "If COMMAND_abc is issued, then CAPTURE_EVENT=COMMAND_abc_was_executed". As another example, it might be of interest to detect not only that a particular command was issued, but that it was issued with particular input parameter values. An event capture specification might therefore refer to one or more parameters of the application programming interface, or "API", of an executing application. As yet another example, an event capture specification might refer to various context, or state-related, values to describe when an event should be captured and emitted. Events may also be triggered responsive to various aspects of the state of the run-time environment itself—such as a file being opened or closed, a change in the state of a connection to a database, the crossing of various task thresholds, and so forth—and event capture specifications may be used to represent conditions for detecting these system-related events. (As will be recognized by those of ordinary skill in the art in view of the discussions herein, conditions within an event capture specification may vary widely in complexity, and relatively simple examples are provided herein for ease of discussion.)

Figure 1:
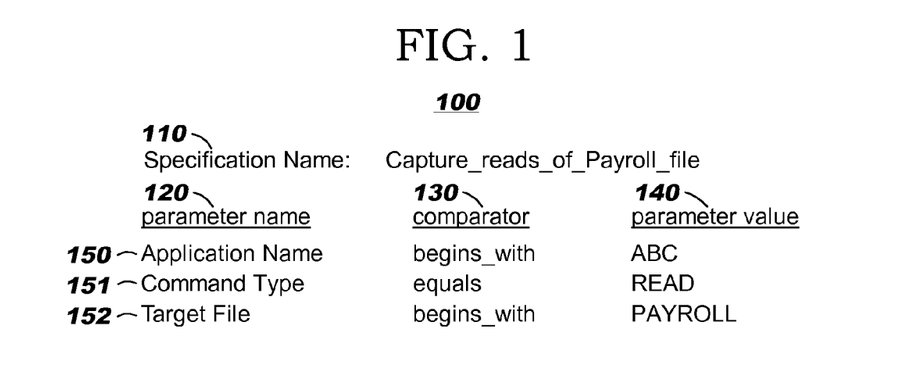
FIGS. 1-2 and 4 illustrate sample event capture specifications.
Figure 2:
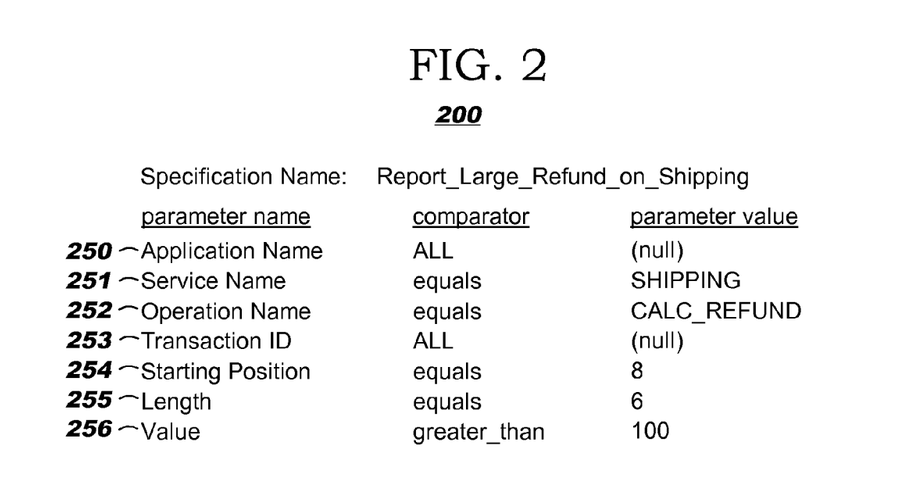

Sample event capture specifications 100, 200 are provided in FIGS. 1 and 2, respectively, and will now be discussed. (As will be obvious, the format shown in FIGS. 1 and 2 is merely illustrative, and other formats may be used without deviating from the scope of the present invention.) Each event capture specification may be comprised of one or more conditions, where the conditions are used as a filter to determine whether an event will be detected. Each condition may be formatted as a parameter name 120, a comparator 130, and a parameter value 140.

A name is preferably associated with each event capture specification, and in the example 100 of FIG. 1, the name is shown at 110 as "Capture_reads_of_Payroll_file". This sample capture specification comprises 3 conditions 150, 151, 152, as follows:

Condition 150 specifies that the parameter name 120 of interest is "ApplicationName", the comparator 130 is "begins_with", and the parameter value 140 is "ABC".

Condition 151 specifies that the parameter name 120 of interest is "CommandType", the comparator 130 is "equals", and the parameter value 140 is "READ".

Condition 152 specifies that the parameter name 120 of interest is "TargetFile", the comparator 130 is "begins_with", and the parameter value 140 is "PAYROLL".

In other words, this event capture specification 100 will detect an event when any application having "ABC" at the beginning of the application name issues a "READ" command on any file having "PAYROLL" at the beginning of the file name. One such file might be named "PAYROLL_INPUT", for example, while another is named "PAYROLL_OUTPUT". Capturing an event upon a READ to these files might be deemed useful, for example, as a way of tracking which applications are reading the payroll files stored at a data center. When the conditions of this filter are met, a record might be written to an event log, and/or a message might be displayed on an operator console. The record or message might specify the full application name and the full name of the target file, and possibly various additional information, where these values may be gathered upon detecting that the filter is matched. As an example of additional information that might be included in a record or message generated responsive to matching the filter, it may be deemed useful to gather context information describing the system state at the time of matching the filter. The manner of identifying the information which is to be gathered for inclusion in such record or message may vary widely, and the actual processing that occurs upon matching a filter may also vary.

Event capture specification 200 of FIG. 2 depicts several different parameters, as contrasted to specification 100. In this example 200, the capture specification named "Report_Large_Refund_on_Shipping" contains 7 conditions 250-256, and these conditions are directed toward detecting when any application (see condition 250) invokes a "CALC_REFUND" operation (see condition 252) of a "SHIPPING" service (see condition 251) for any transaction (see condition 253), with the further requirements that a value (see condition 256) that starts at position 8 (see condition 256) of a record and extends for 6 bytes (see condition 255) is greater than 100. Conditions 254, 255 thus specify that positions 8-13 of the record are of interest. These positions 8-13 of the record might specify, for example, an amount of a refund, in which case the conditions 254, 255, 256 are designed to indicate that the event of interest pertains to refund amounts greater than $100. (Note that while the column headings in the figures refer to "parameter name", this is for drafting convenience. In some instances, the values shown in the "parameter name" column are not actually named parameters or fields, but rather are attributes of data to be referenced in the predicate. "Starting Position" 254 and "Length" 255 of FIG. 2, for example, are attributes of the "Value" field 256.)

For the event capture specifications discussed herein, it is presumed that the conditions within a particular event capture specification are evaluated using "AND" logic—that is, all of the specified conditions are taken together as a filter, and all of the conditions must be matched in order for the event to be detected. A facility might be provided, alternatively, for entry of a Boolean operator (so that, for example, the conditions could be evaluated in the alternative, using "OR" logic).

Non-invasive event capture specifications of the type discussed above are used in the IBM® CICS® Transaction Server product marketed by International Business Machines Corporation. ("IBM" and "CICS" are registered trademarks of International Business Machines Corporation in the United States, other countries, or both.) In the case of the CICS Transaction Server product, a CICS application invokes services of the CICS run-time environment to carry out various processing. This invocation of the run-time is generally performed when an application program issues a command of the form "EXEC CICS <command_name>", where the value used in the "command_name" parameter is chosen from a predetermined set of command names that allow a CICS application to make use of CICS resources and capabilities. A non-exhaustive list of such resources and capabilities includes reading or writing a file (with a READ or WRITE command, respectively), linking to a different program within the scope of a transaction, invoking a web service, or receiving input from a user. Each command has a predetermined number of parameters. When an EXEC CICS <command_name> is executed by a CICS application, control is passed to the CICS run-time for processing of the command, using the specified parameter values. (Details of the CICS commands and their parameters are not deemed necessary to an understanding of the present invention, and are therefore not discussed in further detail herein.)

When using the event capture specification mechanism provided in the CICS Transaction Server, the processing invoked at the CICS run-time will check whether the particular execution of the invoked command is enabled as an event capture point—that is, whether event capture specifications have been deployed into the run-time environment for processing upon the occurrence of this command invocation. (An event "capture point", as that term is used herein, refers to a point in the run-time environment that is adapted for testing event capture specifications. This generally comprises selected command invocations as well as the start of program execution.) If a capture point is enabled, the run-time environment evaluates whether the set of conditions in any of the deployed event capture specifications is matched. The event capture processing provided by the CICS Transaction Server allows comparing against a wide variety of values, which are generally described as belonging to one (or more) of three predicate types, namely (1) context predicates; (2) event option predicates; and (3) application data predicates. In the general case, however, such a grouping by type is not required, and an event capture specification might allow filtering predicates that include the command that triggered the capture point, values of one or more of the command parameters, data contained within the parameters (e.g., specific field values within a record that is passed as an input parameter), the context in which the command has been issued, and so forth.

Figure 3:
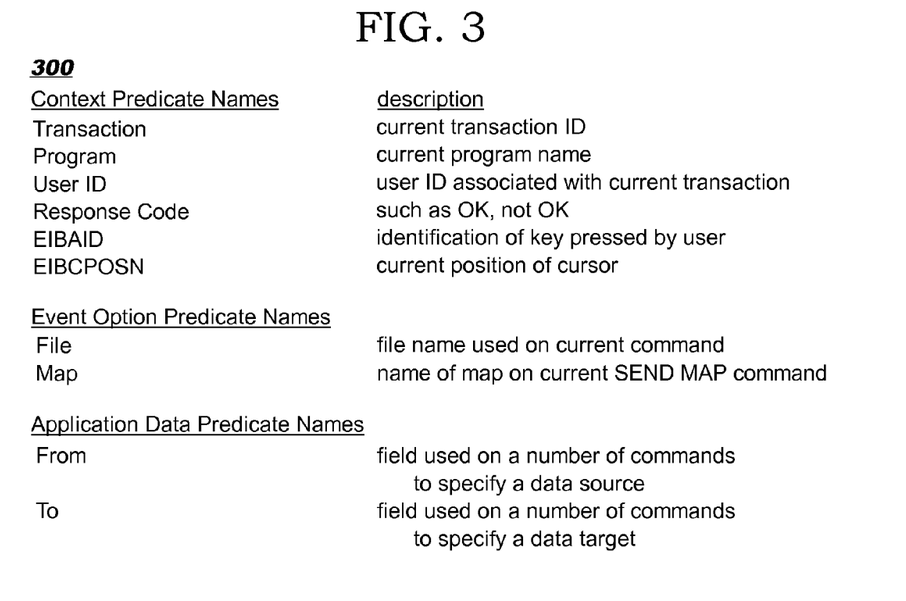
FIG. 3 provides several examples of the parameters that may be used in event capture specifications.

Several of the parameters that may be used in event capture specifications processed by the CICS Transaction Server are listed 300 in FIG. 3. An event capture specification may be designed to capture an event according to a wide range of conditions which are specified therein as filtering predicates. The information that may be tested by the event capture specification and/or included in the emitted event is generally chosen from data values available at a capture point. Certain data values are available for use by all types of events, such as an identification of the current user and an identification of the current transaction, whereas availability of other data values depends on the context of the capture point (and a schema that defines allowable combinations is preferably used when creating event detection filtering predicates). Therefore, it should be understood that the parameters in FIG. 3 are provided by way of illustration of the functioning of the present invention, and not by way of limitation. Furthermore, a detailed discussion of these parameters is not deemed necessary to an understanding of the present invention, and reference may be made to publicly-available documentation for further information on the meaning and use of the parameters. An embodiment of the present invention may be used with event capture specifications that support additional or different parameters, where this information may be specified using varying format and syntax, without deviating from the scope of the present invention.

As can be seen by the above discussion, the event capture specification mechanism is a very powerful and very flexible way to provide event capture support that is non-invasive to the application. However, it may happen that a change to an application, the resources which it references, the layout of fields within records used by the application, and so forth will impact how or whether an event is still captured correctly after the change.

Suppose, for example, that a change is made to the files of the data center where an event capture specification 100 of FIG. 1 or 200 of FIG. 2 is deployed. In the example of FIG. 1, for purposes of illustration, it might happen that the "PAYROLL_INPUT" and "PAYROLL_OUTPUT" files are renamed to "PAY_INPUT" and "PAY_OUTPUT". In the example of FIG. 2, it might happen that the record layout used by the SHIPPING service is reorganized, causing the data value which had been stored in positions 8-13 (which are referenced at 254, 255) to move to a different location, such as positions 10-15. These changes to the underlying data will cause the event capture specifications 100, 200 to no longer function correctly, and the events that were intended to be captured according to these specifications will now go undetected.

Input to the search facility as disclosed herein may be specified in a number of ways. In the general case, the search input may be the name, or a partial name, of a resource which can be referenced in any way within an event capture specification, or of a field in an interface that can be referenced in a capture specification. For example, in the Payroll file example discussed above with reference to FIG. 1, a partial name "PAY" might be provided as a search input parameter, or a full file name "PAYROLL_INPUT" might be provided to reduce the search processing. The search can be performed against a set of static event capture specifications, and/or against capture specifications which have been deployed into the run-time environment. The location and/or format of the event capture specifications might vary based on these two choices, but in either case, an embodiment of the present invention is adapted for evaluating the event capture specifications in view of search input values that describe a changed resource and providing an identification of the event capture specifications which might be impacted without having to actually run the application and observe the run-time behavior thereof.

Referring to the example discussed of FIG. 1, for example, search input having semantics "Target File Name begins with PAY" might be specified to find every event capture specification in which the target file name begins with the letters "PAY" (in a scenario directed to predicting the impact of changing the file name from "PAYROLL_INPUT" to "PAY_INPUT", for example, which would affect the existing predicate 152). For the example discussed above with reference to FIG. 2, search input having semantics of "Operation Name begins with CALC AND Starting Position is greater than 7" might be specified to find every event capture specification in which the operation name begins with the letters "CALC" (with reference to predicting the impact of a change which might affect the existing predicate 252) and in which a starting position greater than 7 is specified (with reference to predicting the impact of a change which might affect the existing predicate 254). Many other examples of both simple and compound search input may be apparent to one of ordinary skill in the art in view of the teachings disclosed herein.

The search facility as disclosed herein embodies an understanding of the way in which the filtering predicates in an event capture specification will be matched against the various context information, event options, and application data at run time. For example, the search facility understands the semantics of the comparators (which may also be referred to as operators) in the individual predicates, and therefore evaluates the predicates in view of those semantics. This allows the search facility to predict whether a change as described by the search input will impact (or will potentially impact) the detection of an event at run time.

A traditional search for references to a particular string is not well suited for determining whether a change has the potential for impact, as such potential impacts may arise (for example) from values in a predicate that can only be understood in view of the comparator used with the predicate or from event capture specifications which allow events to be captured regardless of the value of the changed resource. Although an embodiment of the present invention performs a static search that evaluates filtering predicates without actually executing the application logic, the search is adapted for considering the dynamic conditions that will be encountered at run time. Thus, in some cases, the prediction generated from the search will be in terms of a potential impact to event detection at run time, rather than a definite impact.

Understanding the semantics of the comparators, and predicting the impact of change on an event capture specification that is evaluated at run time, will now be illustrated with reference to the event capture specifications 400, 420, 440 of FIG. 4. In the example event capture specification 400, a single condition 410 is used to provide semantics of "input file name does not begin with C", such that an event is captured and emitted each time the name of the input file used by the executing application logic begins with some character other than "C". In the sample syntax of FIG. 4, the comparator 411 for the condition 410 is represented as "not_starts_with" and the compared-to value 412 of the condition is "C". Because the input file name is not known until run time, in this example, it cannot be determined merely by a static evaluation of the event capture specification 400 whether condition 410 will be matched at run time.

Now suppose that a file named "COMP" has been changed—perhaps to increase the length of one or more fields within the file—and it is desired to predict how that change might impact event emission. Accordingly, an intelligent search as disclosed herein may be used for determining what event capture specifications might be impacted by the change to the file—and thus predicting the impact of the change. By specifying the file name "COMP" as a search input parameter, it can be seen that the event capture specification 400 will not be included in the search output. That is, because file "COMP" will not match the filtering predicate 410, the change to file "COMP" does not impact whether, or how, an event is emitted by event capture specification 400.

Figure 4:
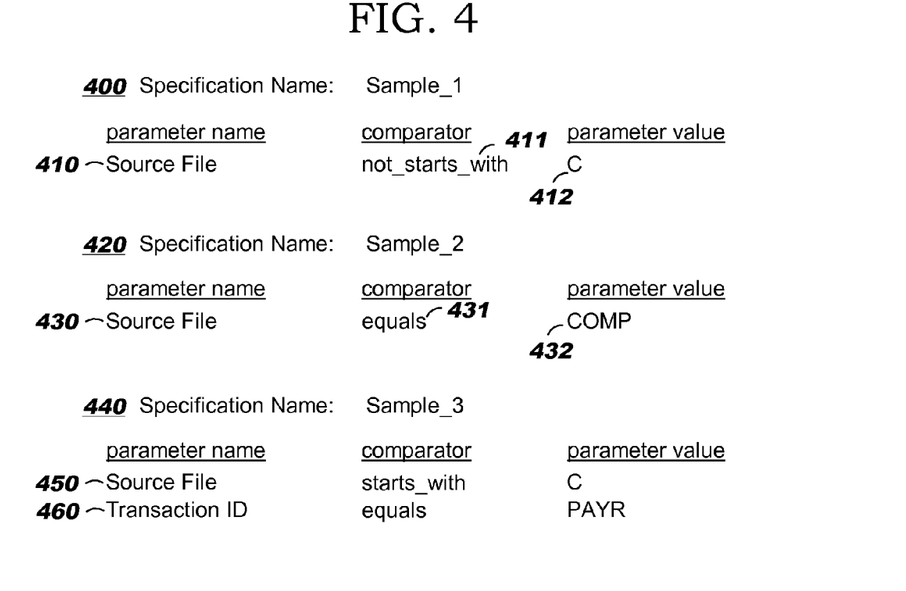

On the other hand, event capture specification 420 of FIG. 4 is directed toward emitting an event when the input file name used by the executing application logic equals "COMP". See reference numbers 431, 432 of condition 430. Given the same change that was just discussed—i.e., changes to the file "COMP"—a search input parameter that uses file name "COMP" will include event capture specification 420 as output because this specification will emit an event involving the changed file "COMP". This may be reflected in the output generated by an embodiment of the present invention on a "yes" list or a "definite match" list.

Event capture specification 440 of FIG. 4 is directed toward emitting an event when the input file name used by the executing application logic begins with "C" (see condition 450) and a transaction ID used by the executing application logic equals "PAYR" (see condition 460). Because it is not known until run time whether the transaction ID "PAYR" will ever refer to a file named "COMP", it cannot be determined statically (that is, during the search) whether both predicates 450, 460 will be true. Thus, it cannot be determined statically whether event capture specification 440 would emit an event related to the file named "COMP". Accordingly, specification 440 may be provided on a "maybe" list or a "potential match" list in the output from the search.

An embodiment of the present invention may optionally be tunable to control the number of "false positives" that are generated from the search. For example, matches that would appear on a "maybe" list may be omitted when limiting false positives.

Event capture specifications used with CICS Transaction Server are initially specified as files encoded in the well-known Extensible Markup Language, or "XML", notation. When an event capture specification is deployed into the CICS run-time environment, an install process is performed which transforms the filtering predicates specified therein from the XML notation into a format that is better suited to run-time evaluation. Event capture specifications encoded in XML format and not yet deployed to the run-time are referred to herein as "local" or "static" event capture specifications, and an embodiment of the present invention is adapted for searching these XML documents to evaluate the filtering predicates specified therein. Event capture specifications which have been deployed to the run-time may be searched by querying an API which, in an embodiment of the present invention, exposes the details of one or more deployed event capture specifications to allow the filtering predicates to be interpreted by the search. An "Inquire Capture Spec" command may be used, for example, to query various details of a deployed event capture specification. A parameter may be passed on this command, for example, to return the values of the parameter name, comparator, and/or parameter value specified in each predicate of a deployed event capture specification.

Figure 5:
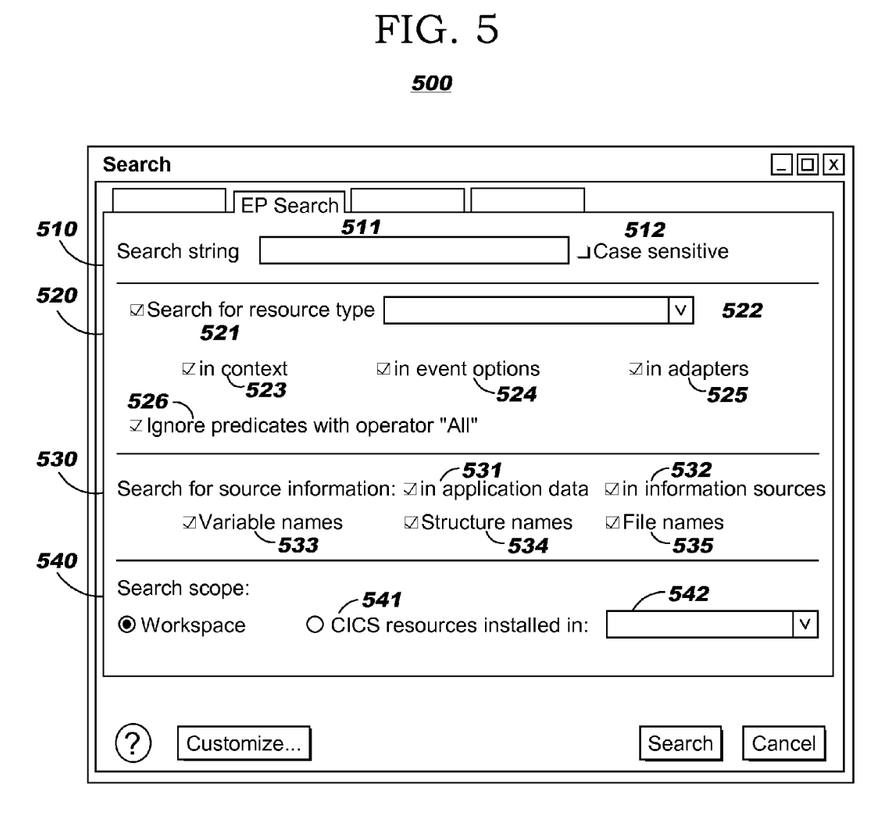
FIG. 5 shows a sample graphical user interface that may be used in an embodiment of the present invention to accept search input parameters from a user.

As noted earlier, a schema may be used to define allowable predicates for use in event capture specification, ensuring (for example) that the comparator chosen for a particular predicate is valid for the parameter name used in that predicate. Corresponding restrictions may be placed on the search interface which is used to query for impact of change. FIG. 5 shows a sample search interface 500 that may be used in an embodiment of the present invention to accept search parameters from a user, as will now be discussed.

The search input used by an embodiment of the present invention may be organized into different logical groupings. As shown in FIG. 5, an embodiment of the present invention organizes search parameter input into 4 primary types, namely (1) search string 510; (2) resource type information 520; (3) source information 530; and (4) search scope 540. Combinations of one or more of these types of information may be accepted from a user (such as a systems programmer or applications programmer) to create a particular search that is then carried out to predict the impact of a change, as will now be described in more detail.

Search string input 510 may be used to provide free-form input for a search, whereby a text entry box 511 is used for entry of text by a user. Optionally, a checkbox 512 may be provided to allow a user to specify that the text entered at 511 is to be used in a case-sensitive manner.

Resource type 520 may optionally be selected using checkbox 521, and allows the user to request that the search be limited to a particular type of resource. Valid resource types may vary, depending on an environment in which an embodiment of the present invention is deployed. A non-limiting illustrative list of resource types that may be selected (for example, from drop-down list 522) includes EVENT, FILE, OPERATION, PROGRAM, QUEUE, TRANSACTION, USER, and WEBSERVICE. Resources of at least some of these various resource types may be used in the context in which an application program executes, and thus checkbox 523 may be checked to search the selected resource type(s) within the application context. Or, the resource might be used in an event specification and/or in an event adapter. Accordingly, checkboxes 524, 525 may be checked to search these locations. (An event adapter, as that term is used herein, is executable code that transforms collected values into a particular event format for emission, responsive to detecting an event. Note that event adapters do not use predicates in the same way they are used in event capture specifications: an event capture specification chooses whether an event will be emitted by using a predicate to define conditions for a match against a resource, whereas an adapter uses a resource to emit the event. For example, a message broker event adapter needs a message queue resource name, identifying a queue where the detected events will be written.)

Source information 530 may optionally be selected using checkboxes 531-535, and allows the user to designate particular sources of information to be evaluated. As shown in FIG. 5, these sources may comprise application data 531 and other information sources 532. The source information search may be further constrained to compare the search input to data of selected sources 531 and/or 532 to variable names 533, structure names 534, and/or file names 535. The "Ignore predicates with operator "All"" checkbox 526 may be used to exclude from the search any predicate that uses the "ALL" keyword. See, for example, conditions 250 and 253 of FIG. 2, which use this keyword to indicate that all application names and all transaction IDs, respectively, are considered as matching these filtering predicates for event capture specification 200. Accordingly, checkbox 526 allows for an optimization during the search by omitting analysis of such "match all values" conditions.

Optionally, a scope of the search may be controlled by user input. In the example of FIG. 5, a radio button 540 is provided with which the user can select to use the current workspace as the scope of the search. Or, radio button 541 may be selected to limit the scope of the search to resources which are installed in a particular region, and the region may then be chosen using drop-down list 542.

Figure 6:
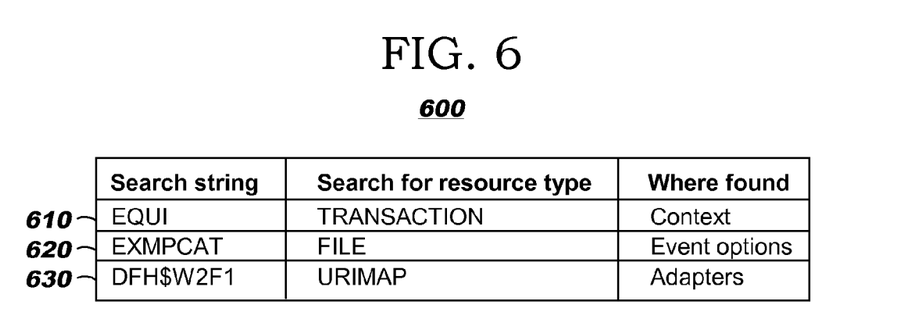
FIG. 6 illustrates search input values of several example searches that may be requested using the search interface of FIG. 5.

Sample searches that may be requested using search interface 500 are shown at 600 of FIG. 6. In a first search 610, the user entered the string "EGUI" in the search interface at 511 and selected "TRANSACTION" as the resource type using the drop-down list at 522, and further chose "in context" at 523. Accordingly, search 610 represents a search for transactions involving the string "EGUI" in a context filter. In a second search 620, the user entered the string "EXMPCAT" at 511 and selected "FILE" as the resource type using the drop-down list at 522, and further chose "in event options" at 524. Accordingly, search 620 represents a search for the string "EXMPCAT" in files used in an event options filter. In a third search 630, the user entered the string "DFH$W2F1" at 511 and selected "URIMAP" as the resource type using the drop-down list at 522, and further chose "in adapters" at 525. Accordingly, search 630 represents a search for the string "DFH$W2F1" in an event adapter for a URIMAP resource (where the string "DFH$W2F1" is an example of a URIMAP name).

Figure 7:
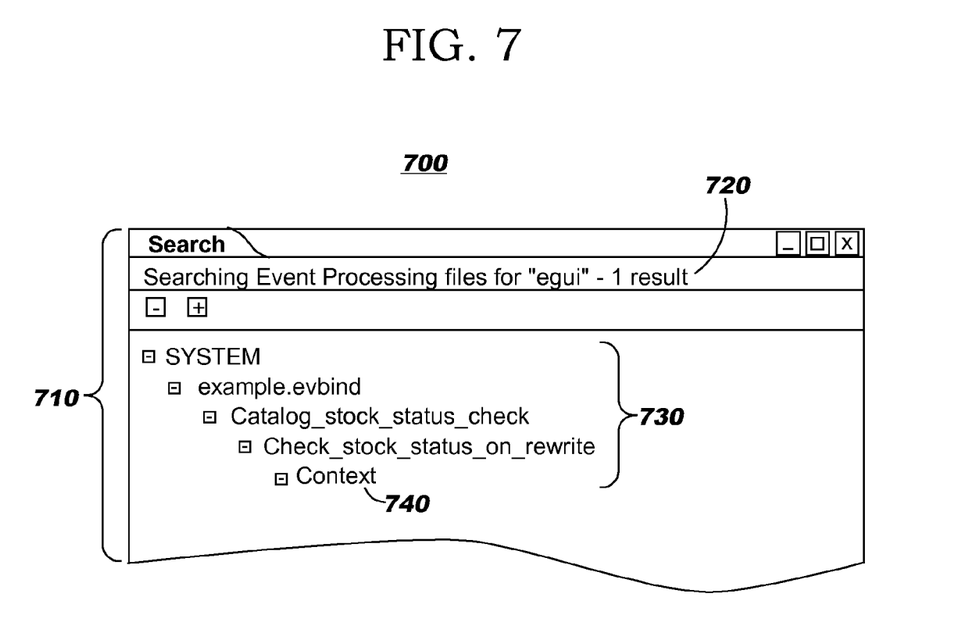
FIG. 7 illustrates sample search output which is provided, in this case, as a report on a graphical user interface.

FIG. 7 illustrates a sample search output which is provided, in this case, as a report 710 on a graphical user interface 700. (As will be obvious in view of the disclosure provided herein, other report formats may be provided without deviating from the scope of the present invention.) In this sample layout, the search parameters are shown at 720 (which is to search event options for the string "egui", in the example), and a hierarchical view 730 shows the location of a context filter 740 from an event capture specification that matches the search parameters. Hierarchical information shown at 730 explains, in this particular example, that the match was found in an event capture specification named "Check_stock_status_on_rewrite" that is contained within a "Catalog_stock_status_check" event specification from an event binding named "example.evbind". An embodiment of the present invention preferably enables a user to click on the displayed results 730 to load an editor in which the underlying event capture specification can be viewed in its entirety.

Figure 8:
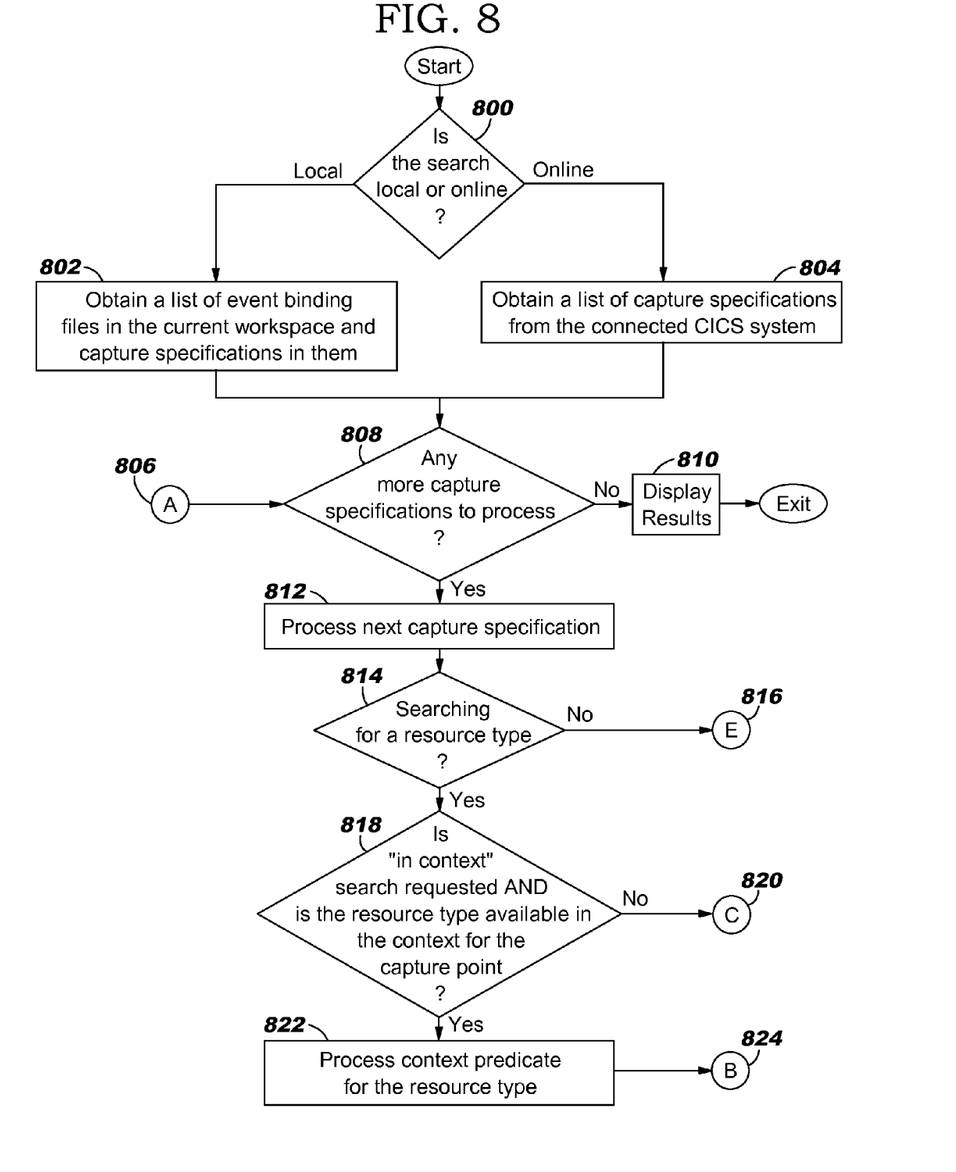
FIG. 8 provides a flowchart depicting logic which may be used when implementing an embodiment of the present invention.

Turning now to FIG. 8, a flowchart is provided depicting logic which may be used when implementing an embodiment of the present invention. Block 800 tests whether the search is to be performed as a local search 802 or as an online search 804. As noted earlier, a local search evaluates event capture specifications which may be stored as XML documents. Event capture specifications which are related to one another may be stored together, and the term "event binding files" is used in FIG. 8 to refer to such a collection of XML documents. An online search, as that term is used herein, refers to a search of event capture specifications which have been deployed into the run-time environment, and which are therefore evaluated through an API as noted earlier. Accordingly, when a local search is selected, Block 802 obtains a list of the event binding files which are available in the current workspace, as well as the event capture specifications stored in those event bindings. When an online search is selected, Block 804 obtains a list of the event capture specifications that have been deployed into the run-time environment—that is, into the connected CICS system when an embodiment of the present invention is used in a CICS environment.

Once the list of event capture specifications has been obtained at either Block 802 or Block 804, control reaches Block 808, which tests whether there are any more of these event capture specifications that have not yet been evaluated. Block 808 is also reached when the evaluation of a previously-selected event capture specification has completed at Block 882, as indicated by connectors 884, 806. When the test at Block 808 has a negative result, meaning that the search of all available event capture specifications is now completed, control transfers to Block 810 where the results of the search are displayed. This preferably comprises displaying all of the hits that were encountered during the processing of FIG. 8 (where these hits will be discussed in more detail below), and may use a report format such as the example discussed above with reference to FIG. 7. As noted above, the display of results may allow the user to invoke an editor to view an event capture specification which has been located by the processing of FIG. 8. Following Block 810, the processing of FIG. 8 exits.

When the test at Block 808 has a positive result, meaning that there are still event capture specifications that have not yet been evaluated, control reaches Block 812, which begins the processing of the next event capture specification. Block 814 tests whether the current search is searching for a resource type (e.g., responsive to selecting checkbox 521 of FIG. 5). If not, then control transfers to Block 856 (as indicated by the connectors at 816 and 854), which is discussed below.

When the current search is searching for a resource type (i.e., the test at Block 814 has a positive result), processing continues at Block 818, which tests whether this search is searching in a context filter (e.g., responsive to selecting checkbox 523 of FIG. 5) and also whether the selected resource type (which was preferably selected using drop-down list 522 of FIG. 5) is available in this context for this capture point. With reference to the example search 610 of FIG. 6, for example, the test at Block 818 comprises determining whether the TRANSACTION resource type is available in the application context. As noted earlier, information for the current transaction is available at all capture points, and thus the text at Block 818 will have a value of TRUE for the example search input 610. Other types of context information, such as the name of the currently-executing application, are available only for application-related events but not for system-related events. Accordingly, Block 818 has a negative result in such cases. When the test at Block 818 has a negative result, then a match will not be found for this resource type using context, so control transfers to Block 834 (as indicated by the connectors at 820 and 832) to see if a match can be found using event options, as discussed in more detail below.

When the test at Block 818 has a positive result, then it may be possible to find a match by evaluating the context, so Block 822 begins the processing of the context predicate for the selected resource type. With reference to the example search 610 of FIG. 6, for example, the search will look for a condition in the currently-evaluated event capture specification that refers to the TRANSACTION resource type. Processing then continues at Block 828 (as indicated by the connectors 824, 826).

Block 828 tests whether the predicate that contains the searched-for resource type evaluates to TRUE. With reference to the example search 610 of FIG. 6, for example, a result of TRUE is obtained at Block 828 if the comparator of the predicate is "begins_with" and the parameter value of the predicate is (by way of example) the string "EGUIXYZ"—or, as another example, if the comparator is "not_equal" and the parameter value is "xGUI". When the test at Block 828 has a positive result, a hit (i.e., a match) is recorded for the context predicate at Block 830. In either case, processing then continues at Block 834.

When an event capture specification is found that matches the search input, an embodiment of the present invention preferably records information about where that match or "hit" was found. This information may be used for providing an in-context explanation of the location of the hit, as shown by the hierarchical information 730 in FIG. 7. Optionally, this information may also be used to enable an editor to be invoked directly from the display of results, for viewing the event capture specification, as has been discussed above.

Block 834 is reached following the evaluation of the predicate for a resource type at Blocks 828, 830, and also through connectors 820, 832 following a negative result at Block 818. Block 834 tests whether this search is searching in the event options (e.g., responsive to selecting checkbox 524 of FIG. 5) and also whether the selected resource type (which was preferably selected using drop-down list 522 of FIG. 5) is available in the event options for this capture point. With reference to the example search 620 of FIG. 6, for example, the test at Block 834 comprises determining whether the FILE resource type is available in the event options. If both of these conditions at Block 834 are met, processing continues at Block 836. Otherwise, a match will not be found using event options, and control therefore transfers to Block 846 (as indicated by the connectors at 842 and 844) to see if a match can be found using event adapters, as discussed in more detail below.

When the test at Block 834 has a positive result, then it may be possible to find a match by evaluating the event options, so Block 836 begins the processing of the event option predicate for the selected resource type. With reference to the example search 620 of FIG. 6, for example, the search will look for a condition in the currently-evaluated event capture specification that refers to the FILE resource type.

Block 838 tests whether the predicate that contains the searched-for resource type evaluates to TRUE. With reference to the example search 620 of FIG. 6, for example, a result of TRUE is obtained if the comparator of the predicate is "equals" and the parameter value of the predicate is the string "EXMPCAT"—or, as another example, if the comparator is "not_equal" and the parameter value is "ABC". When the test at Block 838 has a positive result, a hit (i.e., a match) is recorded for the event option predicate at Block 840. In either case, processing then continues at Block 846 (as indicated by the connectors at 842 and 844) to see if a match can be found using event adapters.

Block 846 tests whether this search is searching in the event adapters (e.g., responsive to selecting checkbox 525 of FIG. 5) and also whether the selected resource type (which was preferably selected using drop-down list 522 of FIG. 5) is available in the event adapter that is referenced by the current event specification. With reference to the example search 630 of FIG. 6, for example, the test at Block 846 comprises determining whether the URIMAP resource type is available in the event adapter. In another example, a search might be conducted to see if an event adapter for emitting events to a named queue refers to a particular named queue, in which case the test at Block 846 might comprise determining whether a "QUEUE_NAME" resource type is referenced by an event specification used by the queue adapter. When the test at Block 846 has a negative result, then a match will not be found using event adapters, so control transfers to Block 856 (as indicated by the connectors at 852 and 854) to see if a match can be found using application data, as discussed in more detail below.

When the test at Block 846 has a positive result, then it may be possible to find a match by evaluating the event adapter, so Block 848 tests whether the resource name in the search input matches the name of the resource in the event adapter. With reference to the example search 630 of FIG. 6, for example, a result of TRUE is obtained if an event adapter refers to a value of "DFH$W2F1" for the URIMAP resource. When the test at Block 848 has a positive result, a hit (i.e., a match) is recorded for the event adapter at Block 850. In either case, processing then continues at Block 856 (as indicated by connectors 852 and 854).

Block 856 tests whether the current search is searching for source information in application data (e.g., responsive to selecting checkbox 531 of FIG. 5) and also whether application data is specified on the current capture point. If either of these tests is not met, then control transfers to Block 876 (as indicated by the connectors at 858 and 874), which is discussed below.

When the current search is searching for source information in application data and application data is specified on the current capture point (i.e., the test at Block 856 has a positive result), processing continues at Block 860, which gets the next application data for evaluating. When an event capture specification is created that uses application data, a data structure definition may be imported and referenced, and thus an event capture specification using application data may refer to multiple items of application data (such as multiple variable names.) Accordingly, Blocks 860-872 loop through these references to application data. Block 862 tests whether more application data is available. If this test has a negative result, then the evaluation of application data is completed, and control therefore transfers to Block 876 (as indicated by the connectors at 864, 874). Otherwise, when more application data is available for evaluation, processing continues at Block 866.

Block 866 tests whether this search is searching in variable names (e.g., responsive to selecting checkbox 533 of FIG. 5) and also whether the variable name of the search string (e.g., the text string entered at 511 of FIG. 5) matches a variable name in the current application data of the currently-evaluated event capture specification. When the test at Block 866 has a negative result, then a match will not be found using variable names, so control transfers to Block 870 to see if a match can be found using structure names, as discussed in more detail below. Otherwise, when the searched-for variable name is a match, Block 868 records a hit for the application data item, after which control returns to Block 860 to get the next application data for evaluation.

When processing reaches Block 870, a test is performed to see whether this search is searching in structure names (e.g., responsive to selecting checkbox 534 of FIG. 5) and also whether the structure name of the search string (e.g., the text string entered at 511 of FIG. 5) matches a structure name in the current application data of the currently-evaluated event capture specification. When the test at Block 870 has a negative result, then a match will not be found using structure names, so control transfers to Block 872 to see if a match can be found using file names, as discussed in more detail below. Otherwise, when the searched-for structure name is a match, Block 868 records a hit for the application data item, after which control returns to Block 860 to get the next application data for evaluation.

When processing reaches Block 872, a test is performed to see whether this search is searching in file names (e.g., responsive to selecting checkbox 535 of FIG. 5) and also whether the file name of the search string (e.g., the text string entered at 511 of FIG. 5) matches a file name in the current application data of the currently-evaluated event capture specification. When the test at Block 872 has a negative result, then a match will not be found using file names, so control returns to Block 860 to get the next application data for evaluation. Otherwise, when the searched-for file name is a match, Block 868 records a hit for the application data item, after which control returns to Block 860 to get the next application data for evaluation.

Block 876 is reached following a negative result at Block 856 (indicating that the current search is not searching for application data, and/or that application data is not specified on the current capture point) and also following a negative result at Block 862 (indicating that there is no more application data to be searched). Block 876 tests whether the current search is searching for source information in information sources (e.g., responsive to selecting checkbox 532 of FIG. 5) and also whether information sources are specified on the current capture point. If either of these tests is not met, then control returns to Block 808 (as indicated by the connectors at 878 and 806) to see if there are more event capture specifications to be processed.

When the current search is searching for source information in information sources and information sources are specified on the capture point (i.e., the test at Block 876 has a positive result), processing continues at Block 880, which gets the next information source for evaluating. An event capture specification may refer to multiple information sources, and Blocks 880-892 loop through these references to information sources. Block 882 tests whether more information sources are available. If this test has a negative result, then the evaluation of information sources is completed, and control therefore returns to Block 808 (as indicated by the connectors at 884, 806). Otherwise, when more information sources are available for evaluation, processing continues at Block 886.

Block 886 tests whether this search is searching in variable names (e.g., responsive to selecting checkbox 533 of FIG. 5) and also whether the variable name of the search string (e.g., the text string entered at 511 of FIG. 5) matches a variable name in the current information source of the currently-evaluated event capture specification. When the test at Block 886 has a negative result, then a match will not be found using variable names, so control transfers to Block 890 to see if a match can be found using structure names, as discussed in more detail below. Otherwise, when the searched-for variable name is a match, Block 888 records a hit for the information source, after which control returns to Block 880 to get the next application data for evaluation.

When processing reaches Block 890, a test is performed to see whether this search is searching in structure names (e.g., responsive to selecting checkbox 534 of FIG. 5) and also whether the structure name of the search string (e.g., the text string entered at 511 of FIG. 5) matches a structure name in the current information source of the currently-evaluated event capture specification. When the test at Block 890 has a negative result, then a match will not be found using structure names, so control transfers to Block 892 to see if a match can be found using file names, as discussed in more detail below. Otherwise, when the searched-for structure name is a match, Block 888 records a hit for the information source, after which control returns to Block 880 to get the next information source for evaluation.

When processing reaches Block 892, a test is performed to see whether this search is searching in file names (e.g., responsive to selecting checkbox 535 of FIG. 5) and also whether the file name of the search string (e.g., the text string entered at 511 of FIG. 5) matches a file name in the current information source of the currently-evaluated event capture specification. When the test at Block 892 has a negative result, then a match will not be found using file names, so control returns to Block 880 to get the next information source for evaluation. Otherwise, when the searched-for file name is a match, Block 888 records a hit for the information source, after which control returns to Block 880 to get the next information source for evaluation.

As has been demonstrated above, an embodiment of the present invention provides a search facility that can be used to predict the impact of change on events detected in application logic, where the change may involve a computing resource used by or referenced by the application logic and/or event detection logic. The search may be performed prior to making a change, in order to judge potential impact of the change, or after the change has been made.

Figure 9:
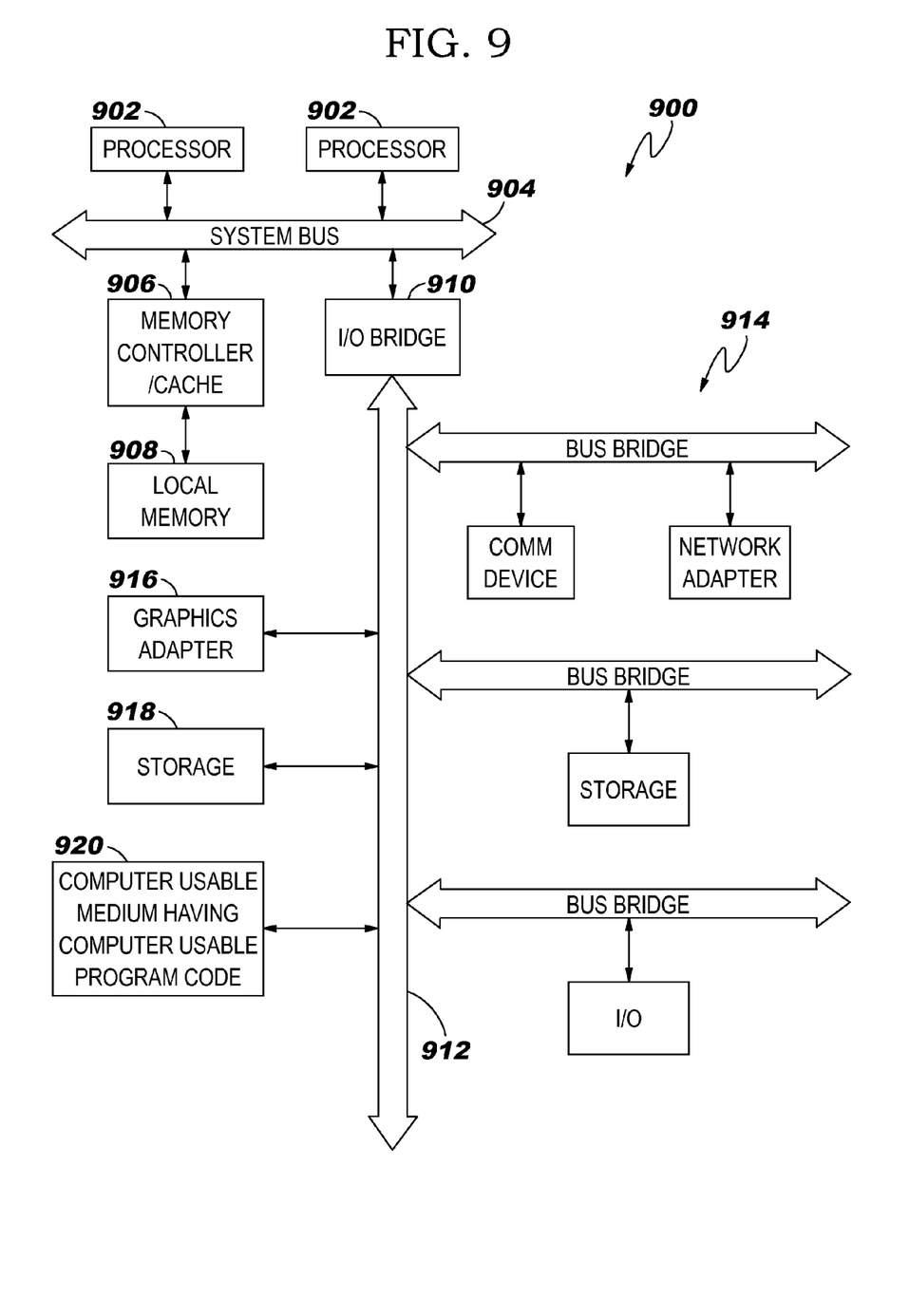
FIG. 9 depicts a data processing system suitable for storing and/or executing program code.

Referring now to FIG. 9, a block diagram of a data processing system is depicted in accordance with the present invention. Data processing system 900, such as one of the processing devices described herein, may comprise a symmetric multiprocessor ("SMP") system or other configuration including a plurality of processors 902 connected to system bus 904. Alternatively, a single processor 902 may be employed. Also connected to system bus 904 is memory controller/cache 906, which provides an interface to local memory 908. An I/O bridge 910 is connected to the system bus 904 and provides an interface to an I/O bus 912. The I/O bus may be utilized to support one or more buses 914 and corresponding devices, such as bus bridges, input output devices ("I/O" devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 916, storage 918, and a computer usable storage medium 920 having computer usable program code embodied thereon. The computer usable program code may be executed to execute any aspect of the present invention, as have been described herein.

The data processing system depicted in FIG. 9 may be, for example, an IBM zEnterprise™ 114 or IBM System z10™ Enterprise Class system, products of International Business Machines Corporation in Armonk, N.Y., running the z/OS® operating system. An object-oriented programming system such as Java may run in conjunction with the operating system and provides calls to the operating system from Java® programs or applications executing on data processing system. ("zEnterprise" and "z10" are trademarks, and "z/OS" is a registered trademark, of International Business Machines Corporation in the United States, other countries, or both. "Java" is a registered trademark of Oracle America, Inc., in the United States, other countries, or both.)

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit", "module", or "system". Furthermore, aspects of the present invention may take the form of a computer program product embodied in one or more computer readable media having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory ("RAM"), a read-only memory ("ROM"), an erasable programmable read-only memory ("EPROM" or flash memory), a portable compact disc read-only memory ("CD-ROM"), DVD, an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency, etc., or any suitable combination of the foregoing.

Computer program code for carrying out operations for aspects of the present invention may be written in any combination of one or more programming languages, including (but not limited to) an object oriented programming language such as Java, Smalltalk, C++, or the like, and conventional procedural programming languages such as the "C" programming language or similar programming languages. The program code may execute as a stand-alone software package, and may execute partly on a user's computing device and partly on a remote computer. The remote computer may be connected to the user's computing device through any type of network, including a local area network ("LAN"), a wide area network ("WAN"), or through the Internet using an Internet Service Provider.

Aspects of the present invention are described above with reference to flow diagrams and/or block diagrams of methods, apparatus (systems), and computer program products according to embodiments of the invention. It will be understood that each flow or block of the flow diagrams and/or block diagrams, and combinations of flows or blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram flow or flows and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram flow or flows and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flow diagram flow or flows and/or block diagram block or blocks.

Flow diagrams and/or block diagrams presented in the figures herein illustrate the architecture, functionality, and operation of possible implementations of systems, methods, and computer program products according to various embodiments of the present invention. In this regard, each flow or block in the flow diagrams or block diagrams may represent a module, segment, or portion of code, which comprises one or more executable instructions for implementing the specified logical function(s). It should also be noted that, in some alternative implementations, the functions noted in the flows and/or blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or each flow of the flow diagrams, and combinations of blocks in the block diagrams and/or flows in the flow diagrams, may be implemented by special purpose hardware-based systems that perform the specified functions or acts, or combinations of special purpose hardware and computer instructions.

While embodiments of the present invention have been described, additional variations and modifications in those embodiments may occur to those skilled in the art once they learn of the basic inventive concepts. Therefore, it is intended that the appended claims shall be construed to include the described embodiments and all such variations and modifications as fall within the spirit and scope of the invention.

The invention claimed is:

1. A system for predicting impact of change on event detection, comprising:
a computer comprising a processor; and
instructions which are executable, using the processor, to implement functions comprising:
obtaining search input describing a changed computing resource, wherein:
the changed computing resource comprises a data object used by an application program; and
the search input comprises a resource name of the changed computing resource; and
programmatically evaluating each of at least one event detection specification, the event detection specification specifying a set of one or more conditions that when matched indicate occurrence of an event that corresponds to the event detection specification, to predict whether the changed computing resource will impact event detection, by the event detection specification, at run time, the programmatic evaluation comprising searching the set of one or more conditions specified in the event detection specification to determine whether the named resource is used therein.

2. The system according to claim 1, wherein:
the search input further comprises a specification of at least one resource type; and
the programmatic evaluation of the at least one event detection specification further comprises searching the set of one or more conditions specified in the event detection specification to determine whether any of the at least one resource type is used therein.

3. The system according to claim 1, wherein the programmatically evaluating further comprises comparing the search input to each of the one or more conditions in the set specified in a particular event detection specification until determining whether a prediction can be made that the changed computing resource will match the condition at run time.

4. The system according to claim 1, further comprising generating a report documenting each programmatically-evaluated event detection specification for which the programmatic evaluation predicts that the changed computing resource will impact the event detection.

5. The system according to claim 1, wherein each of the at least one event detection specification is encoded in a markup language syntax.

6. The system according to claim 1, wherein each of the at least one event detection specification is deployed in an executable format for use at run time.

7. The system according to claim 1, wherein each of the at least one event detection specification is specified externally to code of an application program in which the corresponding event may occur.

8. A computer program product for predicting impact of change on event detection, the computer program product comprising:
a non-transitory computer readable storage medium having computer readable program code embodied therein, the computer readable program code configured for:
obtaining search input describing a changed computing resource, wherein:
the changed computing resource comprises a data object used by an application program; and
the search input comprises a resource name of the changed computing resource; and
programmatically evaluating each of at least one event detection specification, the event detection specification specifying a set of one or more conditions that when matched indicate occurrence of an event that corresponds to the event detection specification, to predict whether the changed computing resource will impact event detection, by the event detection specification, at run time, the programmatic evaluation comprising searching the set of one or more conditions specified in the event detection specification to determine whether the named resource is used therein.

9. The computer program product according to claim 8, wherein:
the search input further comprises a specification of at least one resource type; and
the programmatic evaluation of the at least one event detection specification further comprises searching the set of one or more conditions specified in the event detection specification to determine whether any of the at least one resource type is used therein.

10. The computer program product according to claim 8, wherein the programmatically evaluating further comprises comparing the search input to each of the one or more conditions in the set specified in a particular event detection specification until determining whether a prediction can be made that the changed computing resource will match the condition at run time.

11. The computer program product according to claim 8, further comprising generating a report documenting each programmatically-evaluated event detection specification for which the programmatic evaluation predicts that the changed computing resource will impact the event detection.

12. The computer program product according to claim 8, wherein the search input informs the programmatic evaluation of what to compare to in the set of one or more conditions.

13. The computer program product according to claim 8, wherein:
each of the at least one event detection specification is specified externally to code of an application program in which the corresponding event may occur; and
the obtaining and the programmatically evaluating are performed without executing the code of the application program.

14. The computer program product according to claim 8, wherein a first schema defines allowable combinations of values in the one or more conditions in the set.

15. The computer program product according to claim 14, wherein a second schema defines allowable combinations of values in the search input.

* * * * *